US009138062B2

(12) United States Patent
Todd (10) Patent No.: US 9,138,062 B2
(45) Date of Patent: Sep. 22, 2015

(54) MOLDED SEAT

(71) Applicant: Mark Todd, Jacksonville, FL (US)

(72) Inventor: Mark Todd, Jacksonville, FL (US)

( * ) Notice: Subject to any disclaimer, the term of this patent is extended or adjusted under 35 U.S.C. 154(b) by 0 days.

(21) Appl. No.: 13/775,111

(22) Filed: Feb. 22, 2013

(65) Prior Publication Data

US 2014/0239678 A1 Aug. 28, 2014

(51) Int. Cl.
| | |
|---|---|
| *A47C 9/00* | (2006.01) |
| *A47C 7/74* | (2006.01) |
| *A47C 7/18* | (2006.01) |
| *A47C 7/20* | (2006.01) |
| *B60N 2/64* | (2006.01) |
| *B60N 2/28* | (2006.01) |

(52) U.S. Cl.
CPC ............... *A47C 7/748* (2013.01); *A47C 7/185* (2013.01); *A47C 7/20* (2013.01); *A47C 7/74* (2013.01); *B60N 2/643* (2013.01); *B60N 2002/2818* (2013.01)

(58) Field of Classification Search
CPC ............ A47C 5/12; A47C 7/12; A47C 7/022; A47C 7/18; A47C 7/02; A47C 7/18
USPC ............. 297/452.27, 180.12, 452.21, 452.28, 297/452.22, 452.26, DIG. 1, DIG. 2
See application file for complete search history.

(56) References Cited

U.S. PATENT DOCUMENTS

| | | | | |
|---|---|---|---|---|
| 3,987,507 | A * | 10/1976 | Hall ........................ | 297/DIG. 1 |
| 4,753,480 | A * | 6/1988 | Morell ..................... | 297/452.27 |
| 5,390,384 | A * | 2/1995 | Dinsmoor, et al. ...... | 297/452.27 |
| 6,093,468 | A * | 7/2000 | Toms et al. .................... | 428/67 |
| 6,161,238 | A * | 12/2000 | Graebe .................... | 297/452.28 |
| 6,371,562 | B1 * | 4/2002 | Yoshimura et al. ...... | 297/452.26 |
| 6,419,863 | B1 * | 7/2002 | Khac ....................... | 297/DIG. 1 |
| 6,447,058 | B1 * | 9/2002 | Jackson .................. | 297/452.37 |
| 6,523,202 | B2 * | 2/2003 | Loomos ........................... | 5/653 |
| 6,652,034 | B1 * | 11/2003 | Schramm et al. ........ | 297/DIG. 1 |
| 6,733,072 | B2 * | 5/2004 | Jaillet et al. .............. | 297/452.27 |
| 6,877,808 | B2 * | 4/2005 | Lichtinger et al. ....... | 297/452.26 |
| 6,942,299 | B1 * | 9/2005 | Sardo ....................... | 297/452.55 |
| 7,114,771 | B2 * | 10/2006 | Lofy et al. ............... | 297/180.13 |
| 7,120,950 | B2 * | 10/2006 | Garrigues ......................... | 5/420 |
| 7,216,388 | B2 * | 5/2007 | Bieganek et al. ........ | 297/452.26 |
| 7,445,292 | B2 * | 11/2008 | Moule ...................... | 297/452.25 |
| 7,530,640 | B2 * | 5/2009 | Walters et al. ........... | 297/452.27 |
| 7,614,704 | B2 * | 11/2009 | Whelan et al. ........... | 297/452.27 |
| 7,891,033 | B2 * | 2/2011 | Loewenthal et al. .... | 297/452.21 |
| 7,918,510 | B2 * | 4/2011 | van den Nieuwboer et al. ........................ | 297/452.27 |
| 8,291,535 | B2 * | 10/2012 | Kemper .................. | 297/452.27 |
| 2007/0236072 | A1 * | 10/2007 | Galbreath et al. ........ | 297/452.27 |
| 2013/0097777 | A1 * | 4/2013 | Marquette et al. ....... | 297/180.13 |

* cited by examiner

*Primary Examiner* — Jose V Chen
(74) *Attorney, Agent, or Firm* — Steven R. Scott (57) ABSTRACT

A seat incorporating insert(s) intermediate its upper and lower surfaces. A seat insert for the support of the users buttocks conforms to the user's body, has "rebound" properties, and areas adapted to underlie the perineum and/or ischiums of a user softer than the rest of the seat insert. Alternatively, a perineal insert and/or ischium inserts may be used without the seat insert described. Finally, a heatable insert can be used in conjunction with or in the absence of said seat inserts to provide heat for the comfort of a seat user. In all cases, the aforesaid inserts are preferably completely encapsulated and enclosed by the foam materials making up the seat, which can be accomplished by molding the seat around the insert(s), creating a seat with various internal density zones, adjustable heat, and enhanced abilities to conform to the user's body, while limiting pressure on perineum and/or ischiums.

21 Claims, 14 Drawing Sheets

FIG. 1

(PRIOR ART)

MOLDED SEAT

CROSS-REFERENCE TO RELATED APPLICATIONS

This application is a continuation-in-part of parent application Ser. No. 13/624,905 titled "Molded Seat" filed Sep. 22, 2012, the same being incorporated herein by reference and claims priority thereto.

BACKGROUND OF THE INVENTION

1. Field of the Invention

This invention pertains generally to seat bottoms and seat bottom construction, but may have more general applicability to overall seat construction design and techniques. More specifically, the invention pertains to a molded seat bottom which incorporates and has been molded around an insert or inserts shaped in particular ways, having particular characteristics, comprised of particular materials chosen to impart desirable characteristics to the seat, including heating elements, and/or methods and systems for producing seats of this type.

2. Description of the Related Art

Polyurethane, produced by combining monomers including isocyanate functional groups and hydroxyl groups, is a known material for forming resilient seating of all types, including motorcycle seats. The combination process typically requires a catalyst and, for applications similar to those of interest in the instant invention, a mold of some type. In this process, liquid isocyanate and resin are blended at a specific ratio, and the reacting liquid is dispensed into the mold and allowed to cure, then the finished part is demolded. Typically, in high volume manufacturing applications, a dispensing unit is used to combine and dispense the reacting liquid into the mold used in forming the finished piece in a process commonly known as reaction injection molding ("RIM").

Examples of prior art patents that may be found to have teachings relevant to the invention are:

(1) U.S. Pat. No. 3,787,278 for a "Molded Multiple Density Polyurethane Foam" issued Jan. 22, 1974, to Ready et al., describing molded, multiple density polyurethane foams and a process for their preparation.

(2) U.S. Pat. No. 4,572,856 for a "Composite Molded Article and Process Using Self-Positioning Laminated Stiffener" issued Feb. 25, 1986, to Gembinski, describing a stiffener insert incorporated into a molded composite article such as an automobile dashboard by inserting the stiffener insert between a pre-formed plastisol skin forming opposing mold walls.

However, there is a continuing need for devices providing new and improved features in the field of the invention. Further, there are no prior art devices possessing the unique features and advantages inherent in my invention.

SUMMARY OF THE INVENTION

The instant invention teaches a seat having insert(s) or "mat(s)" incorporated therein intermediate its upper and lower surfaces so as, in most cases, to be generally parallel to the upper surface of the seat (i.e., the surface on which the posterior of the user will rest). The primary embodiments of an insert/mat described herein are comprised of material that conforms to the contours of the user's body over a period of time, has certain "rebound" properties (or spring-like performance), and features areas adapted to underlie the perineum and/or ischiums of a user seated on the seat, which areas are softer than the rest of the insert either by virtue of included gap(s) in the insert or by virtue of a softer material filling said gap(s). In another embodiment of the invention, the insert(s) is/are adapted and shaped to underly, e.g., the perineum or ischiums of a user and is/are comprised of a softer material than the surrounding foam. Other insert embodiments may include heating elements. Materials for use in forming such inserts may include a variety of materials including gel-like materials, gel packets, air packets (which may be made adjustable in terms of pressure), and foams.

In the preferred embodiments taught herein, the aforesaid inserts are completely encapsulated and enclosed by the foam materials making up the seat with this being advantageously accomplished by molding the seat around the inserts. This is made possible, in accordance with the teachings of the invention, by providing means for suspending inserts within the mold used in forming the seat so as to be in proper spaced relationship to the upper surface of the seat (on which the user will be seated) and the lower surface of the seat (facing away from the seated user) when formed in the mold. Thus, my invention is enabled to provide a more comfortable seat for the user with—even in the most basic embodiments discussed—enhanced abilities to conform to the user's body and enhanced springiness, while limiting pressure on the perineum. In addition, the "integrated or molded in" aspect of the invention maintains the integrity of the exterior foam seat surfaces, in particular the upper surface of the seat/foam. In this manner, the essential "mechanics" or "workings" of my invention (as provided by said insert(s)) are "hidden" inside the foam making up the seat; protected thereby from wear, weather and the elements; and creating little or no interruption of the top surface in terms of aesthetics or the look/feel of upholstery fit, etc. Further, carefully selecting and designing the properties of the various foams, gels and/or other materials involved, i.e., insert materials, perineal gap materials, ischial gap materials, heating insert materials, and surrounding foam, provides the ability to control the overall suspension effect with zone density control, to better adapt the final composite to the human anatomy and pressures for various applications, and to provide a heated seat with elements hidden from view and protected from wear and weather.

Thus, as opposed to simply adding the same (or a similar) pad on top of the molded foam (which might be an obvious approach), "embedding" or "in-molding" creates a subtle transition between the generally firm areas of the foam and the softer pressure relief areas. It creates soft spots and/or springy areas deep within the foam. Also, simply adding a foam pad on top (consisting of soft, springy and/or firm sections), would result in too abrupt a transition between areas of varying characteristics and density, as opposed to the more "blended" transitions achieved by the instant invention. Another potential problem that adding a pad on top would create (consisting of presumably bonded foam composite of varying densities), is the potential for delamination of the pad composite due to wear and sheer forces. By molding foam around the pad, all of the above issues are solved, and we have created a foam cushion composite with incredibly strong construction and gentle transitions between areas of firm support and soft areas.

These goals and others are all accomplished in an efficient and economical manner using the method I have developed for molding the seat around an insert or inserts including and providing the characteristics described.

DESCRIPTION

Figure 1:
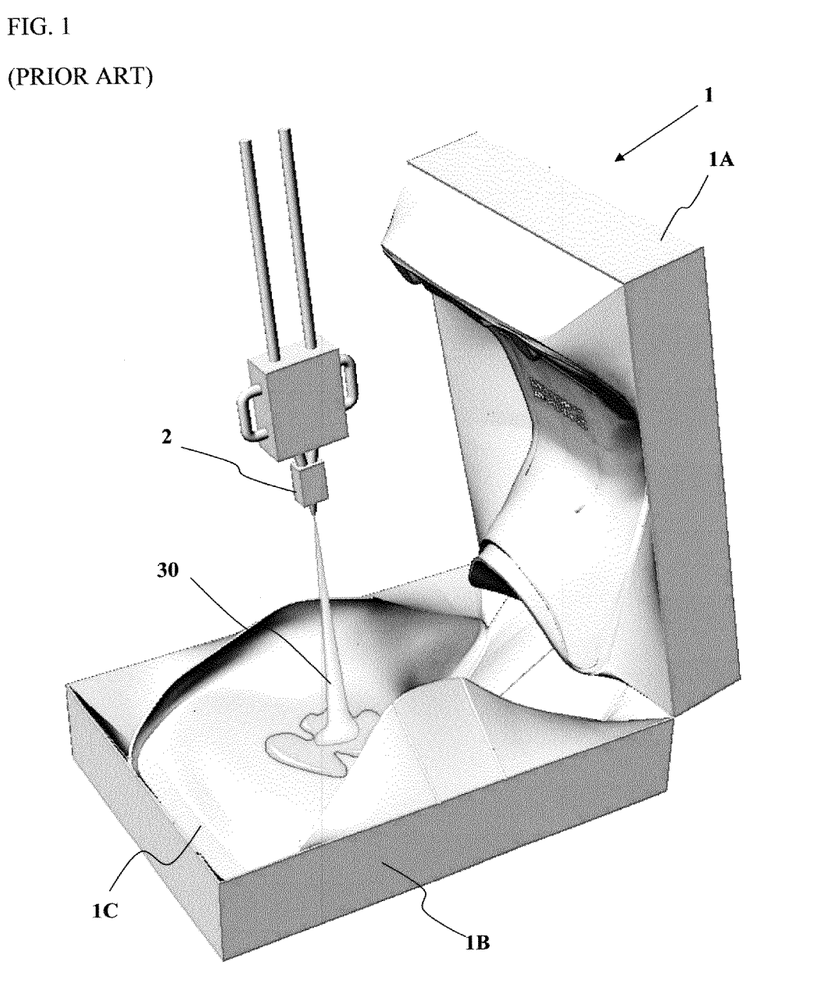
FIG. 1 provides a schematic perspective view of a mold and dispenser for forming an exemplary polyurethane seat in accordance with the teachings of prior art.

The process, construction and apparatus used in the instant invention can best be understood by careful and ordered review of the above-referenced drawing figures, beginning with FIG. 1, which illustrates a mold 1 having an upper mold part 1A and a lower mold part 1B, defining a hollow mold space 1C (in the desired shape of a motorcycle seat in this case) when closed together. (The motorcycle seat shown in the drawing figures provides an example of how the teachings of the invention can be applied in this context, but should not be seen as limiting the scope of the inventive concept to this particular type of seating). As illustrated, and in accordance with the prior discussion of the reaction injection molding process, a dispensing unit 2 is used to combine and dispense the reacting liquid 30 into the mold 1 used in forming the finished piece, a polyurethane motorcycle seat (not illustrated), in accordance with the teachings of prior art. Once an appropriate amount of liquid 30 is dispensed into mold space 1C, the mold is closed, and the reacting liquid 30 expands to fully fill the mold space 1C, taking the desired form/shape of a motorcycle seat as defined by the shape of mold space 1C.

Figure 2:
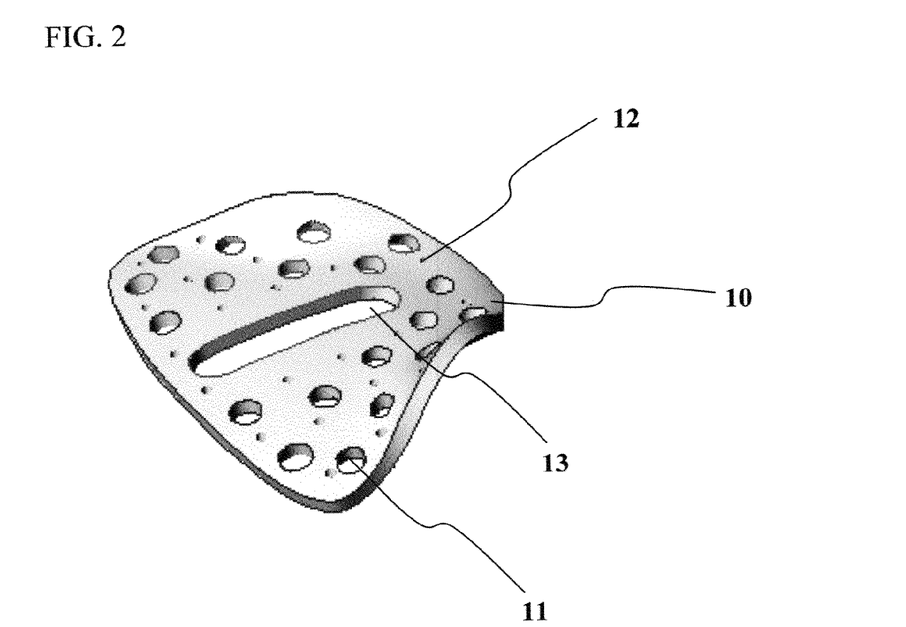
FIG. 2 provides a schematic perspective view of a preferred embodiment of a seat insert in accordance with the teachings of my invention.
Figure 3:
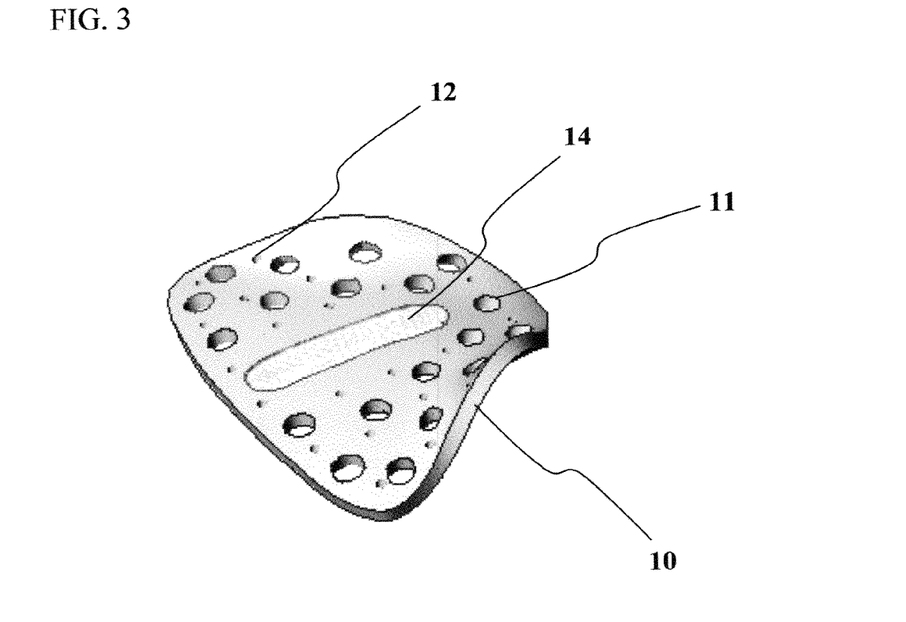
FIG. 3 provides a schematic perspective view of the preferred embodiment of a seat insert illustrated in FIG. 2, wherein the perineal gap therein is filled with an insert which may be comprise, e.g., gel-like materials, gel packets, air packets (which may be made adjustable in terms of pressure), and soft foams or other similar filler(s).
Figure 7:
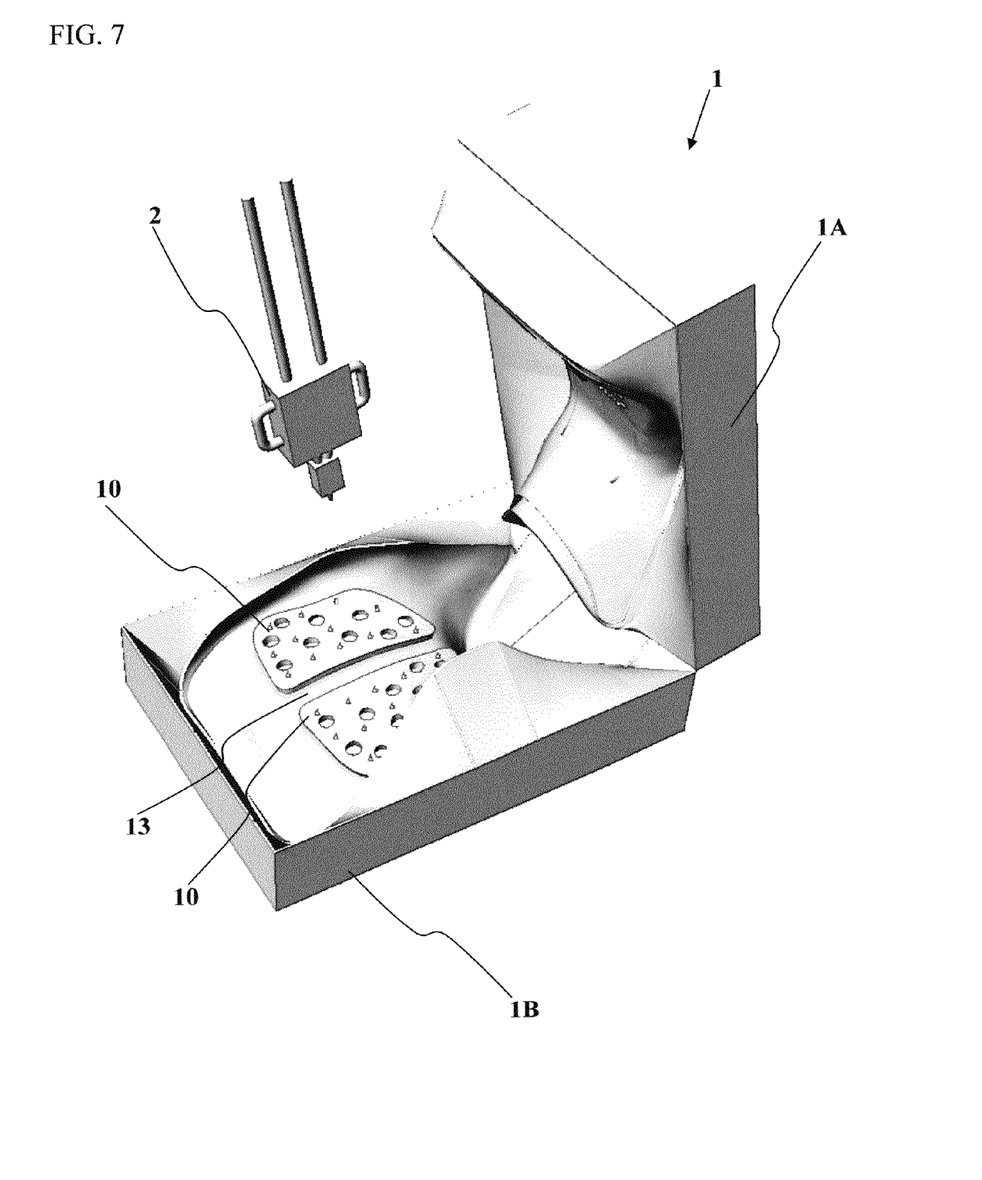
FIG. 7 provides a schematic perspective view of the mold and dispenser including appropriately spaced and configured support pegs as illustrated in FIG. 4 with another preferred seat insert embodiment appropriately mounted thereon in accordance with the teachings of my invention.
Figure 9:
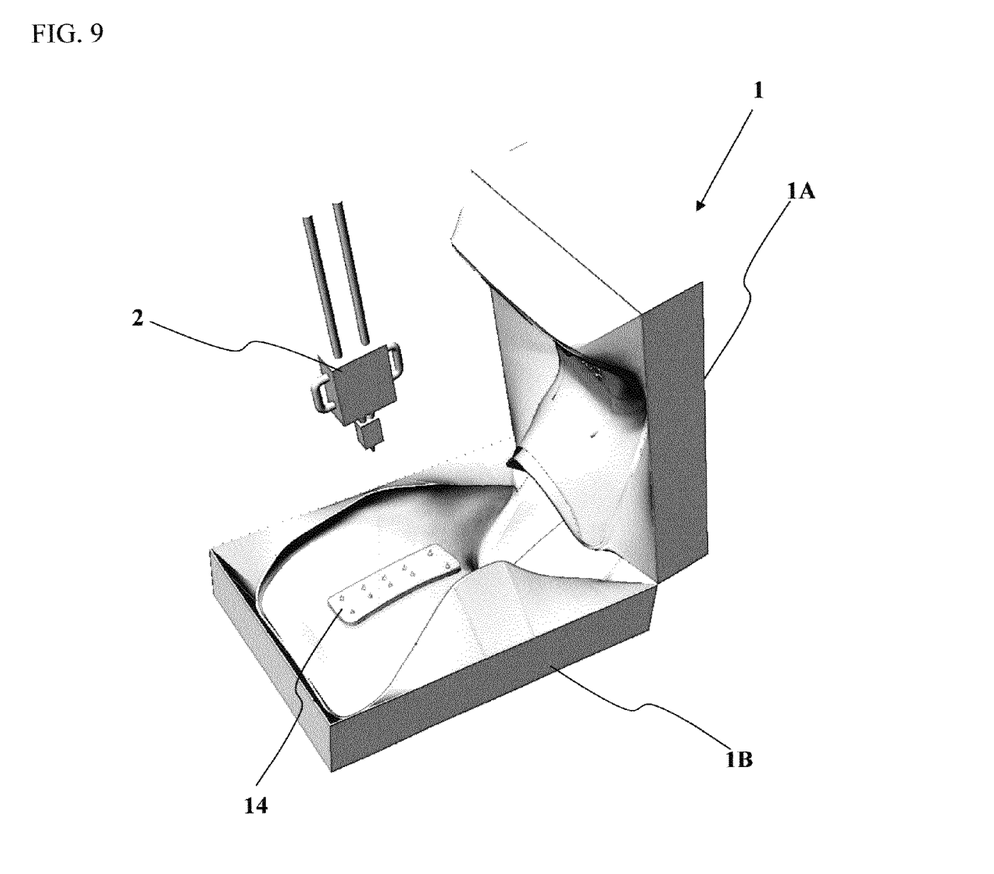
FIG. 9 provides a schematic perspective view of the mold and dispenser including appropriately spaced and configured support pegs for and with a perineal insert appropriately mounted thereon in accordance with the teachings of my invention.
Figure 10:
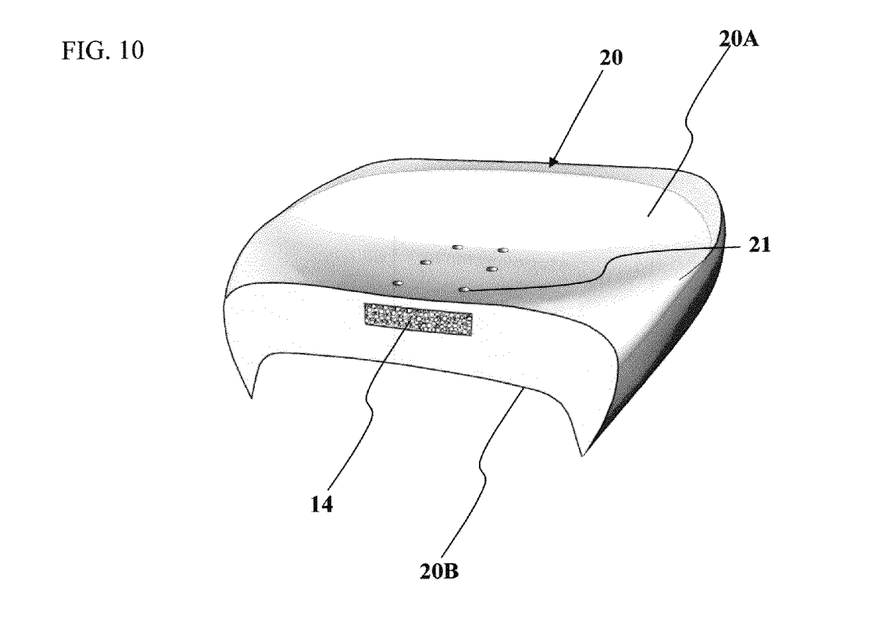
FIG. 10 provides a schematic cross-sectional perspective view of an exemplary motorcycle seat with integral perineal insert formed in accordance with the teachings of my invention.
Figure 16:
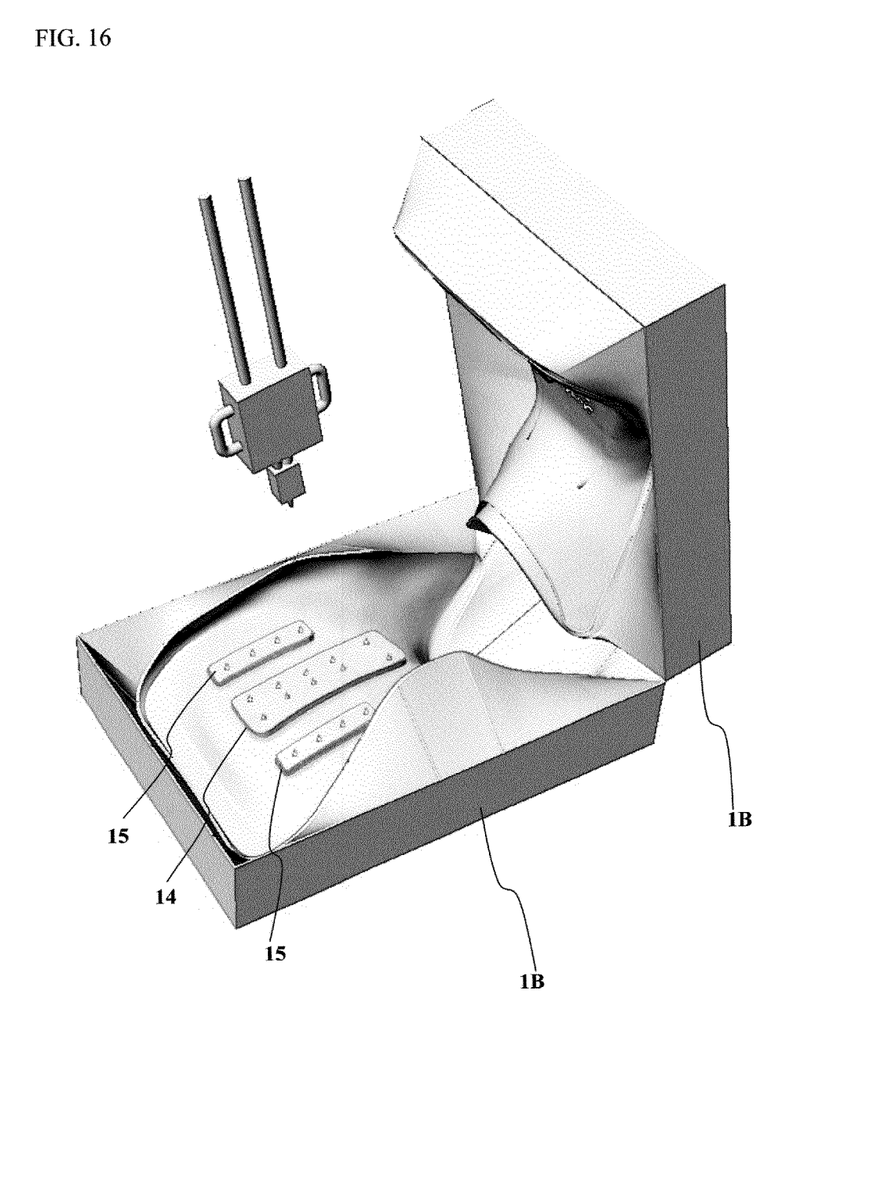
FIG. 16 provides a schematic perspective view of a mold and dispenser including appropriately spaced and configured support pegs for and with a perineal insert and ischium inserts, all appropriately mounted thereon in accordance with the teachings of my invention.
Figure 17:
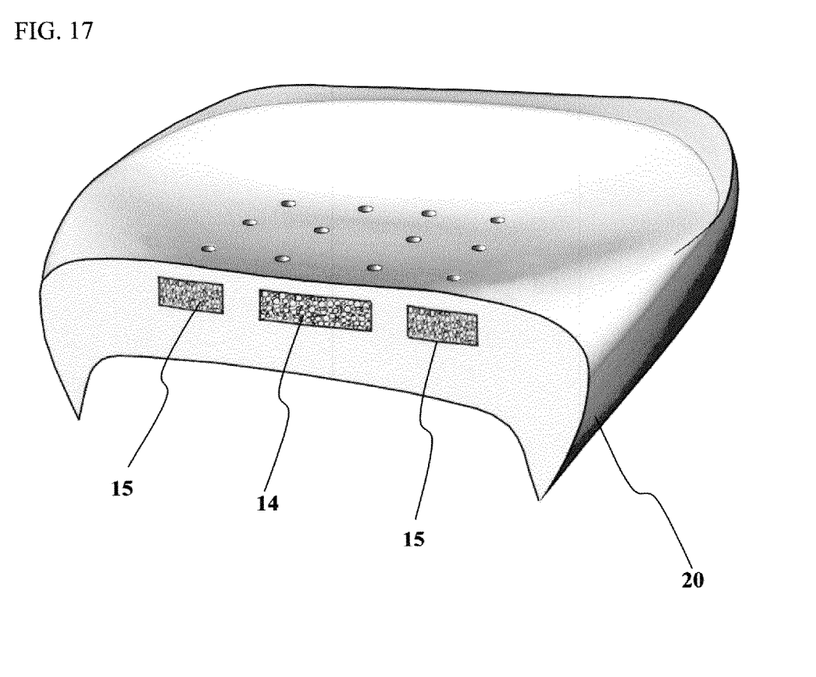
FIG. 17 provides a schematic cross-sectional perspective view of an exemplary motorcycle seat with inserts as illustrated in FIG. 16, all formed in accordance with the teachings of my invention.

With the background previously provided, especially in regard to FIG. 1, the teachings and novelty of FIGS. 2 and 3 can be better appreciated. These drawing figures illustrate an initial preferred embodiment of a seat insert 10 in accordance with the teachings of my invention. As will be noted, both versions illustrated feature foam dispersion and distribution openings/vents 11 scattered across their surfaces, mounting peg openings 12, and a perineal opening 13, with the version of the first embodiment illustrated in FIG. 3 varying from that in FIG. 2 by virtue of the inclusion of a sub-insert/perineal insert 14 in perineal opening 13 which may be comprised of gel-like materials, gel packets, air packets, and soft foams or other similar filler(s), such as super-light density foam. (Where an air packet forms an insert or pad such as perineal insert 14, its pressure may be adjusted by means known in the art by the inclusion of a tube (not shown) leading from the packet to an activatable pump (pot shown) or release valve (not shown) which can be used to adjust the pressure/firmness of the insert). Another embodiment is illustrated in FIG. 7, where perineal opening 13 forms a gap completely separating the two halves of seat insert 10. However, possible embodiments are not restricted to those including seat inserts 10. An embodiments using only a perineal insert 14 is illustrated in FIGS. 9 and 10, while a still further variation, using only perineal inserts 14 and ischium inserts 15 is illustrated in FIGS. 16 and 17.

In the embodiments having larger inserts 10, it is sometimes advantageous to include openings 11 so that reacting liquid 30 can freely move through and around the seat inserts 10 so that there are no unfilled gaps left in the molded seat 20. These holes/openings 11 may be of varying size, frequency of distribution or not included at all, depending on the flow characteristics and/or requirements of each particular mold/insert/seat. Thus, they are not shown in all illustrations, particularly those where open perineal openings 13 and/or ischium openings 19 provide alternate means of distribution which have been found sufficient by themselves for the aforesaid purpose without the inclusion of openings 11. However, the primary purpose of perineal openings 13 and/or ischium openings 19 is to create, include and incorporate a softer area or cushion below the perineum and/or ischiums of the person seated on seat 20.

Perineum/perineal openings 13 are provided as the perineum is more sensitive than surrounding areas for many people. By leaving the perineal opening 13 unfilled as illustrated in FIG. 2), this area will be filled with the somewhat softer polyurethane foam making up the remainder of seat 20. Alternately, as illustrated in FIGS. 3, 9 and 10, a sub-insert/perineal insert 14—which may be comprised of gel-like materials, gel packets, air packets (which may be made adjustable in terms of pressure), and soft foams or other similar filler(s), such as super-light density foam—provides an even softer substrate for this same purpose. Thus, in the version of seat insert 10 aillustrated in FIG. 2 (and FIG. 7) openings 11 will generally be found to be unnecessary, but in the version of insert 10 illustrated in FIG. 3, they will serve a valuable purpose in allowing the complete and even spreading of reacting liquid 30 so that no gaps remain.

As will be appreciated from the drawing figures (and in accordance with their anatomical purpose of underlying the perineal regions of a user), perineal opening 13 and perineal inserts 14 are preferably elongate, which shape defines a long axis that will be aligned with the bilateral axis of the user when seated on seat 20, and serve to separate seat 20 and/or mat/insert 10 into two halves, each of which would support, anatomically, respective buttocks/thighs of the user.

Insert 10 is preferably formed from closed cell foam with characteristics important to the purposes of my invention, though other materials having similar characteristics or other chosen characteristics can be used for this purpose. One such characteristic is "Compression Set", a property that describes the fact that a permanent foam setting or deformation is achieved when a load is place on the seat insert 10 over a period of time. In the instant application this is advantageous because it allows the insert to form itself to the contours of the users body over a period of time, adapting itself to the particular shape and configuration of the user for added user comfort. Vinyl nitrite foam has been found ideal for these purposes. Another important property of any such insert 10 is "rebound" (or spring-like performance), which is a property of vinyl nitrile foam by virtue of its closed cell construction. The inclusion and incorporation of insert 10 in molded seat 20 results in a final molded foam composite (seat 20) that is enhanced with these added properties derived from insert 10. However, as previously mentioned, other materials may be useful for this purpose, particularly other closed cell foam materials.

Figure 4:
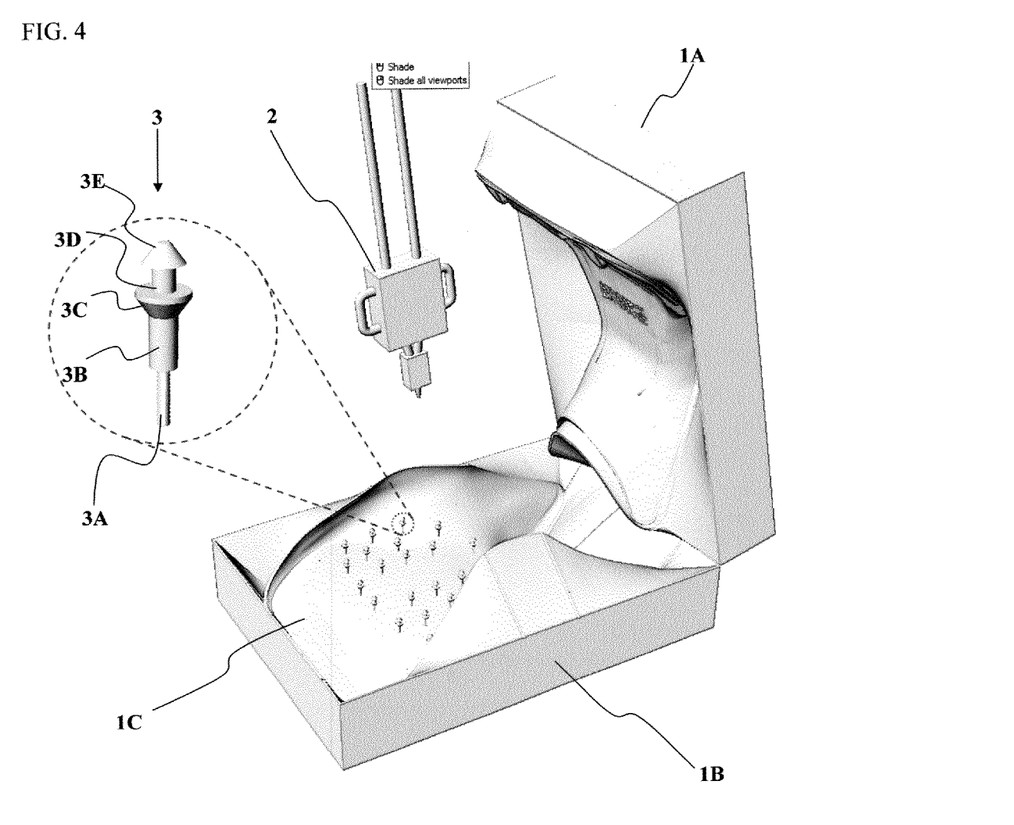
FIG. 4 provides a schematic perspective view of the mold and dispenser of FIG. 1 as adapted for placement and support of a seat insert therein by inclusion of appropriately spaced and configured support pegs in accordance with the teachings of my invention.
Figure 5:
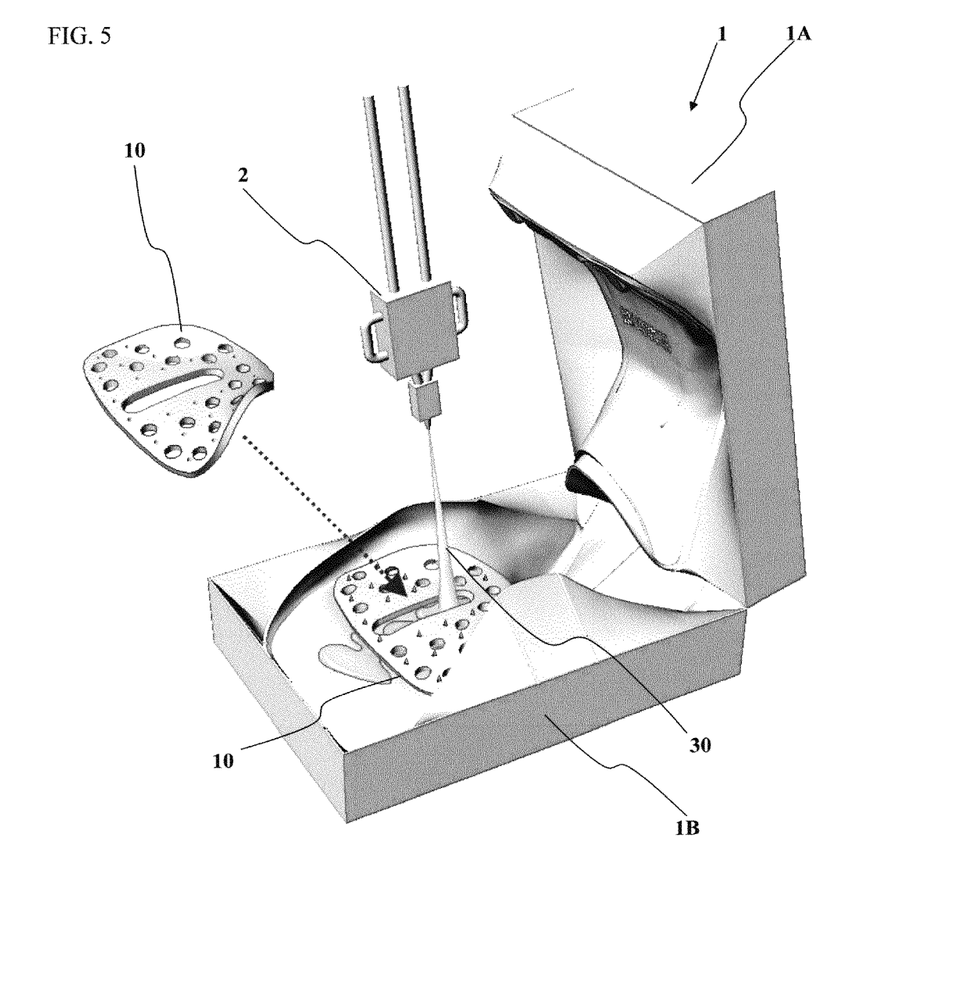
FIG. 5 provides a schematic perspective view of the mold and dispenser including appropriately spaced and configured support pegs as illustrated in FIG. 4 with the seat insert appropriately mounted thereon in accordance with the teachings of my invention.
Figure 6:
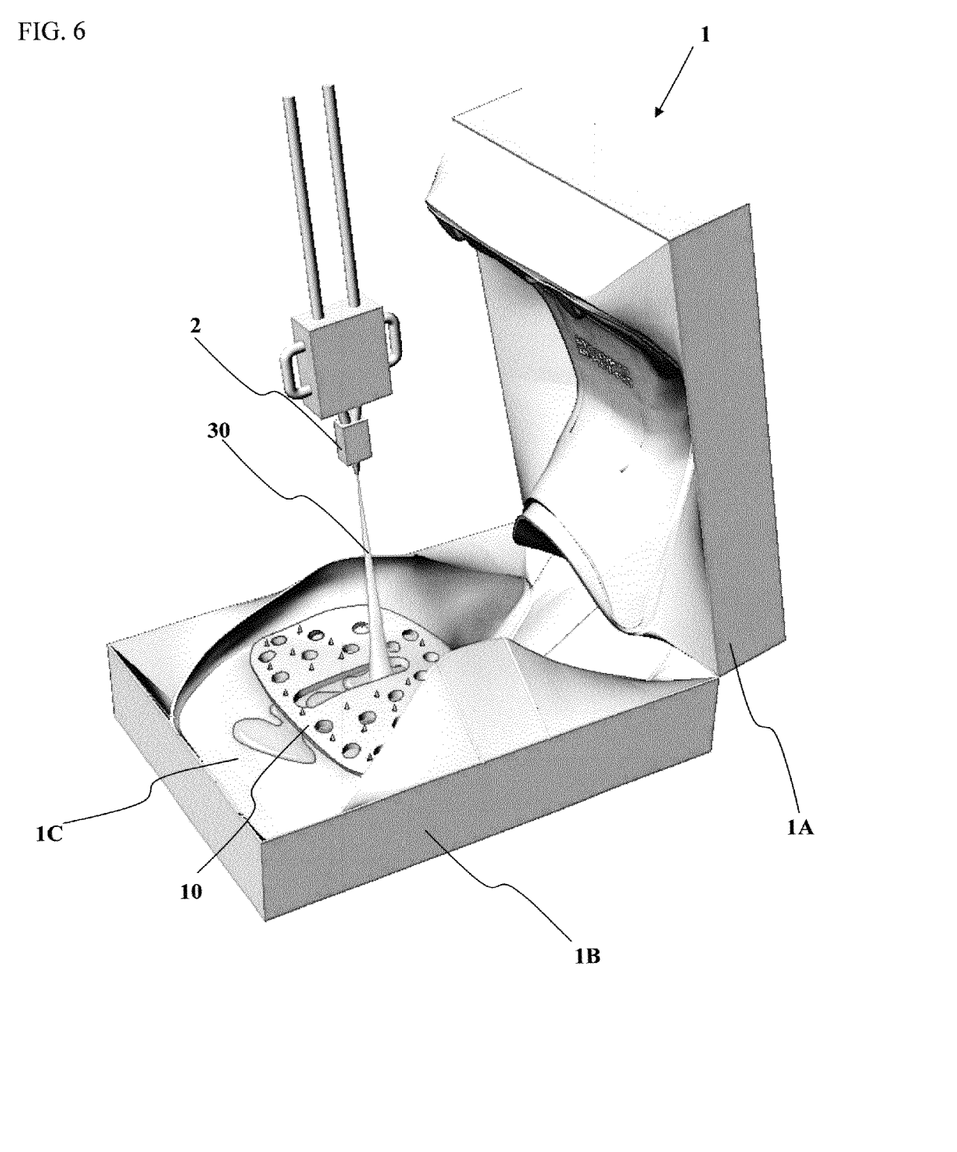
FIG. 6 provides another schematic perspective view of the mold and dispenser including appropriately spaced and configured support pegs as illustrated in FIG. 4 with the seat insert appropriately mounted thereon in accordance with the teachings of my invention.

Review of FIGS. 4 through 6 provide insight into the manner in which, and apparatus used, to adapt the mold 1 of FIG. 1 for placement and support of a seat insert 10 therein in a position intermediate upper mold half 1A and lower mold half 1B. In this position it will be completely enveloped and surrounded by polyurethane foam as part of the reaction injection molding process previously described and thereby completely encapsulated in, enveloped by, and embedded in, the seat 20 formed thereby. (See, e.g., FIG. 8). This is accomplished by the inclusion of appropriately spaced and configured support pegs 3 in mold space 1C, preferably via mounting/attachment of said pegs 3 to lower mold part 1B as illustrated in FIG. 4.

Figure 8:
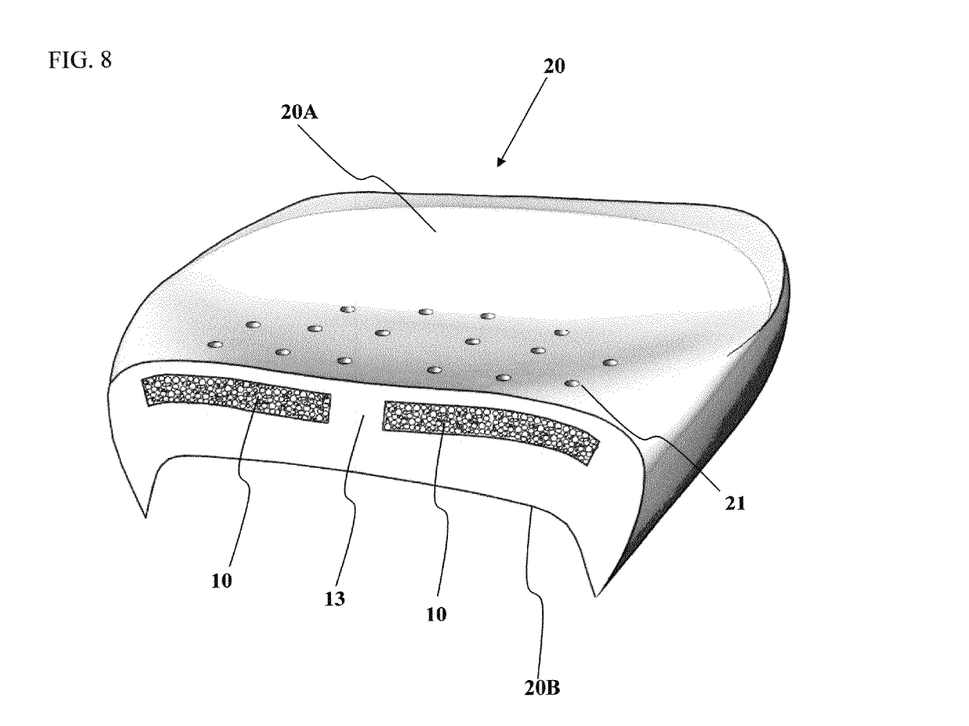
FIG. 8 provides a schematic cross-sectional perspective view of an exemplary motorcycle seat with integral seat insert of the types previously illustrated included therein, all formed in accordance with the teachings of my invention.

As will be noted, pegs 3 can be advantageously formed with a base portion 3A (adapted for insertion in a registering opening provided in mold base portion 3A), support portion 3B (which holds the insert 10 in place within the mold 1 in spaced relationship to the upper mold portion 1A and lower mold portion 1B when the mold 1 is closed), a ledge portion 3C (with a substantially conical shape providing direct support of the insert 10 from below while allowing the seat 20 to be withdrawn—due to its sloped portion—from the mold 1 when it is formed), a barrel section 3D (dimensioned in terms of diameter and length to fit the width of mounting peg openings 12 and the thickness of insert 10), and a substantially conical head 3E (adapted to push through the somewhat flexible material of insert 10 while holding the insert 10 in place from above). Thus, insert 10 can be pressed onto the pegs 2 in mold 1 (as illustrated in FIGS. 5 and 6) so as to be positioned adjacent barrel section 3D so as to be held firmly in place between ledge portion 3C and head 3E through the molding process, and, both insert 10 and seat 20 can be freed from pegs 3 and pulled out of mold 1 (i.e., easily de-molded), when the molding process is complete. When removed, as illustrated in FIG. 8, the seat 20 of the invention will feature a completely embedded and encapsulated insert 10 having the features previously described. Similarly, FIGS. 9 and 10 illustrate the aforesaid teachings and techniques as applied to a perineal insert 14, when used without a seat insert 10.

Figure 11:
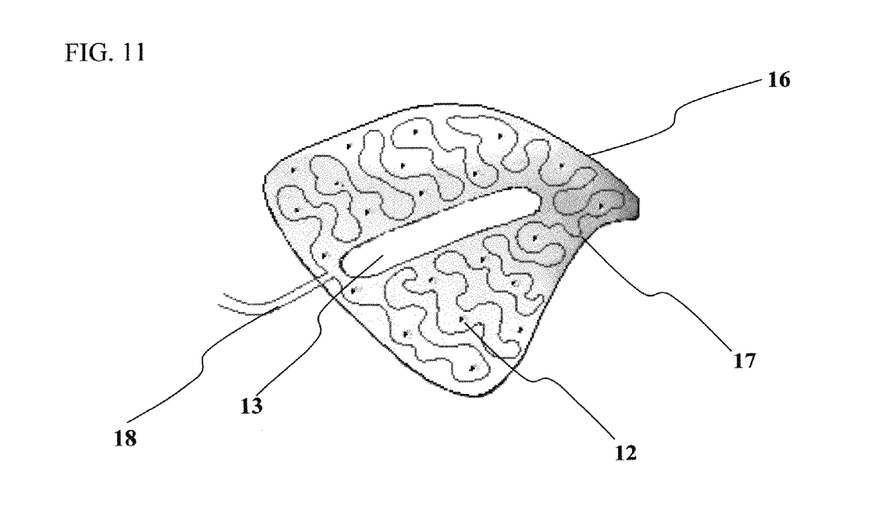
FIG. 11 provides a schematic perspective view of an exemplary heating element pad/insert in accordance with the teachings of my invention.
Figure 12:
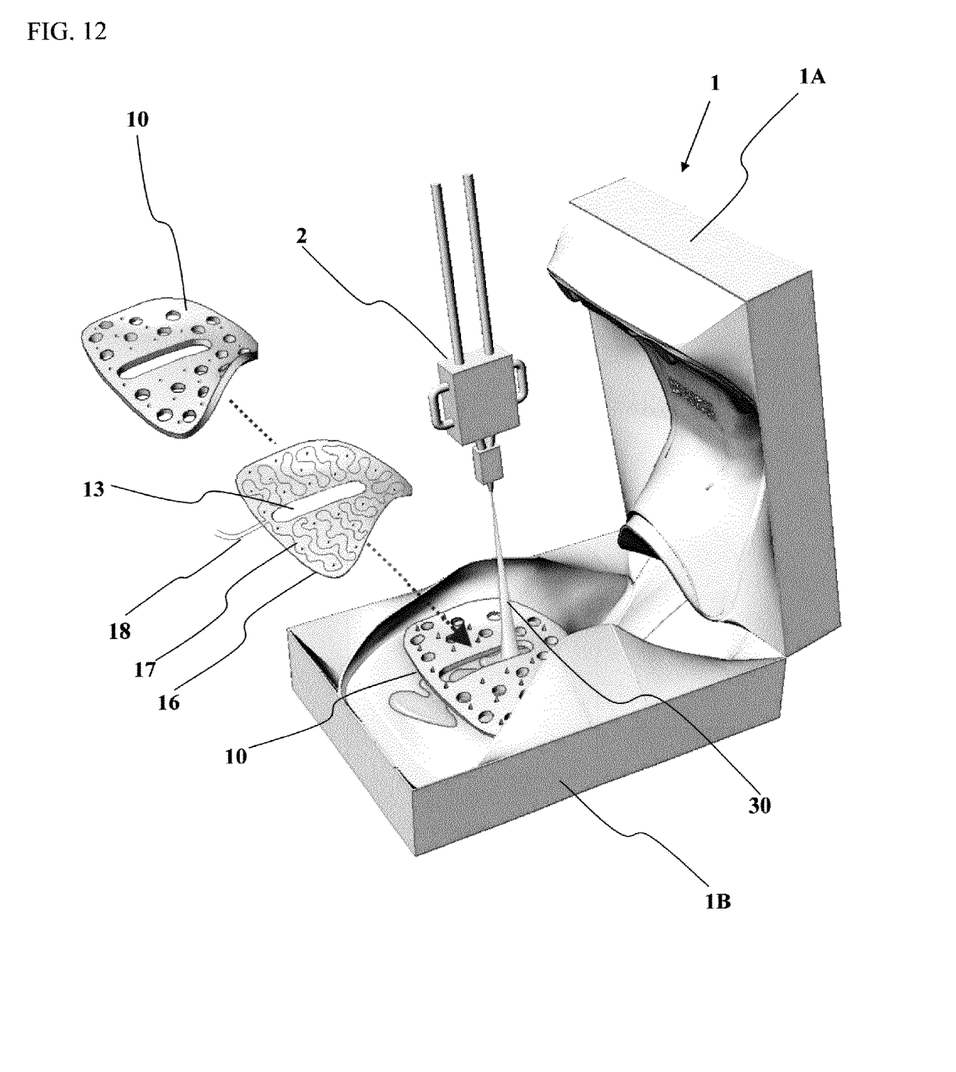
FIG. 12 provides a schematic perspective view of the mold and dispenser including appropriately spaced and configured support pegs with seat insert and heating element pad/insert appropriately mounted thereon in accordance with the teachings of my invention.
Figure 13:
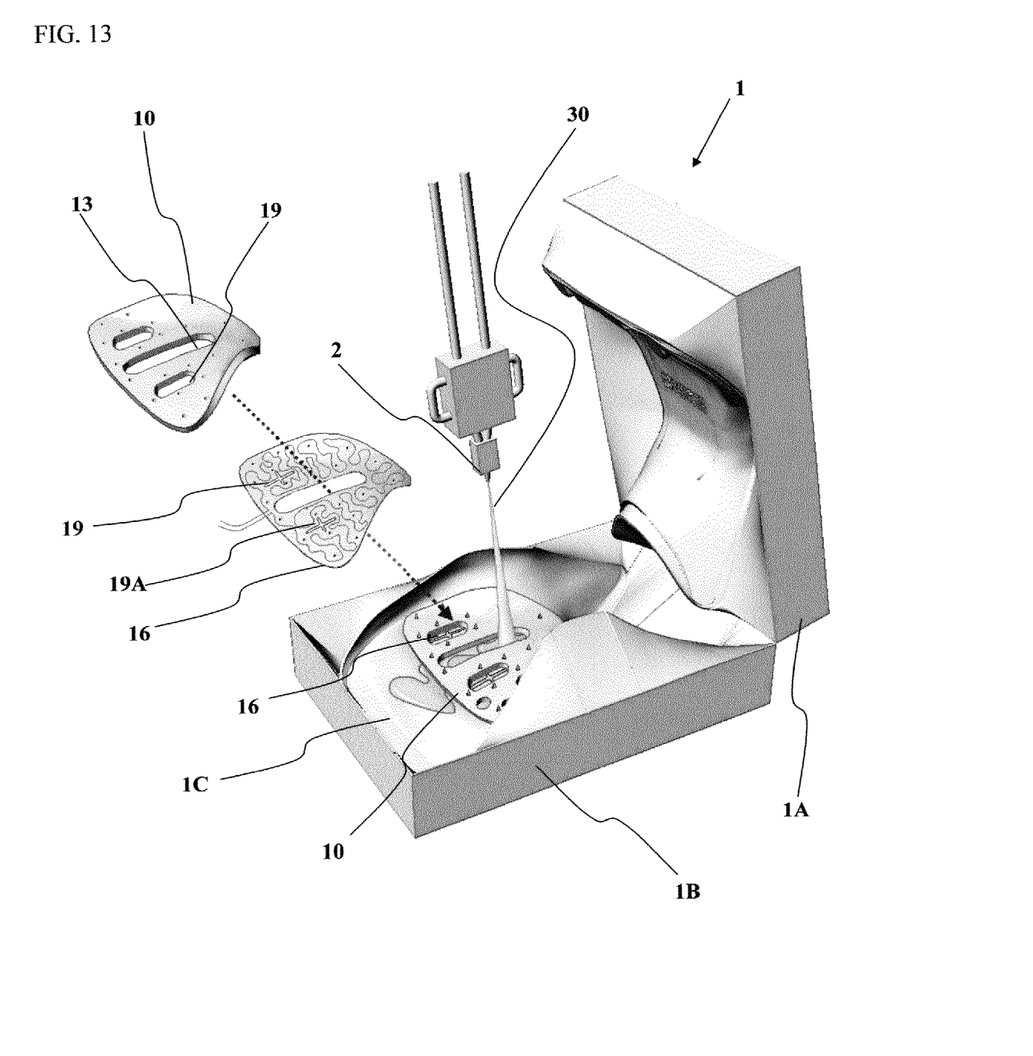
FIG. 13 provides a schematic perspective view of the mold and dispenser including appropriately spaced and configured support pegs with seat insert and heating element pad/insert appropriately mounted thereon in accordance with the teachings of my invention, wherein said inserts have appropriately spaced and configured perineum and ischium openings.

FIGS. 11 through 13 provide further insights into the possibilities of my invention. In this case, illustrating the potential for including a heatable seat insert 16 as well as the previously mentioned ischium openings 19 in seat insert 10 and heatable insert 16. The heatable insert 16 can be made from materials suitable for embedding a heating element/wire 17, and can advantageously be electrically activated by leads 18 connected via a switch to a source of electrical power in accordance with techniques known in the electrical and mechanical arts. The heatable insert 16 is best placed under the seat insert 10 (as illustrated in FIGS. 12 and 13), which assists in buffering, spreading and diffusing the heat produced by the heatable insert 16

Figure 14:
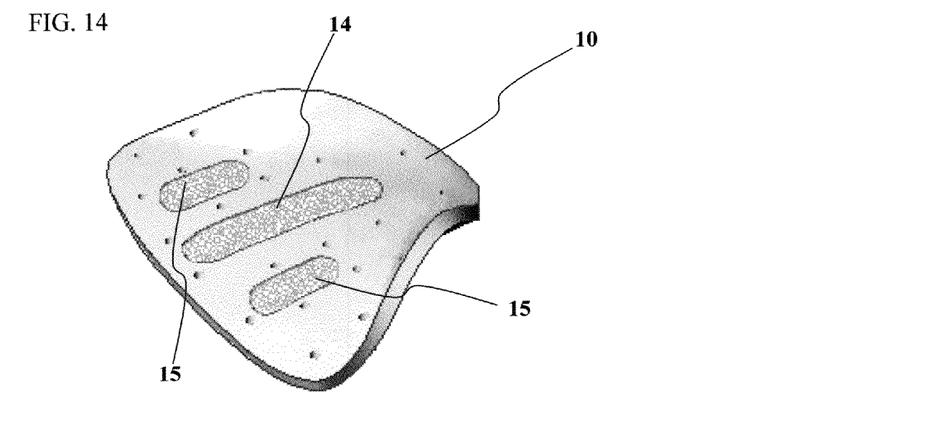
FIG. 14 provides a schematic perspective view of another version of the initial preferred embodiment of a seat insert in accordance with the teachings of my invention, but having both perineal and ischium openings which are filled with gel-like materials, gel packets, air packets (which may be made adjustable in terms of pressure), and soft foams or other similar filler(s).
Figure 15:
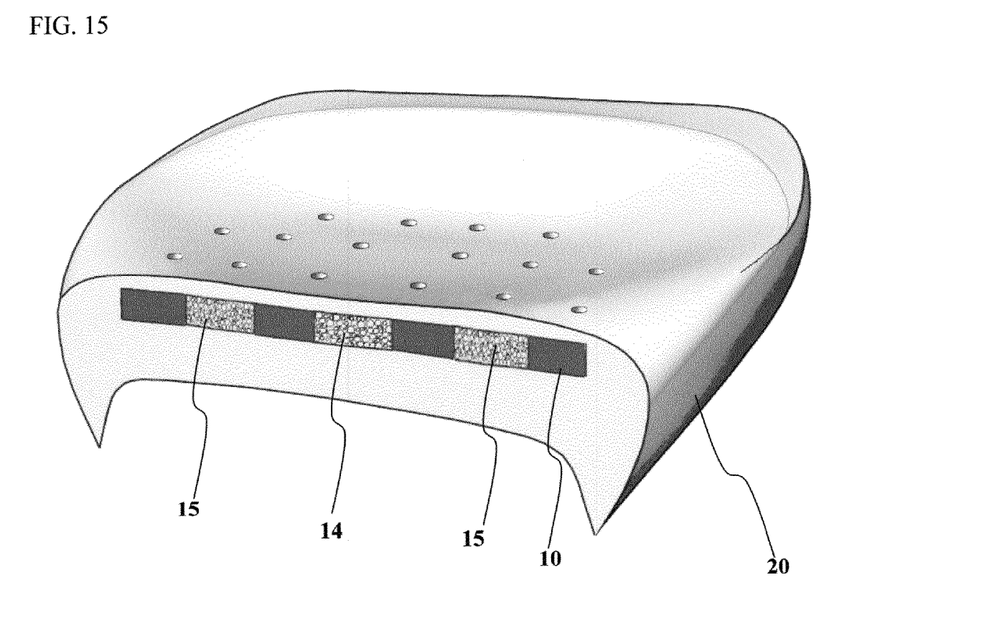
FIG. 15 provides a schematic cross-sectional perspective view of an exemplary motorcycle seat with inserts as illustrated in FIG. 14, all formed in accordance with the teachings of my invention.

The ischium openings 19 illustrated for both seat insert 10 and heatable insert 16 in FIG. 13 are provided because the ischium bones are primary weight supporting skeletal features for the human body when seated, and adjustment of density and seat response under these bones can greatly increase the comfort of a seat to a user. Thus, the ischium openings 19 can be left open as illustrated in regard to seat insert 10 in FIG. 13, or can accommodate an appropriately sized ischium insert 15 having qualities generally in accordance with those previously discussed with regard to perineal inserts 14 in the perineal opening 13. (See, e.g, FIGS. 14 and 15).

Alternatively, particularly with regard to the heatable insert 16, the size of the seat ischium openings 19 can be left open, but minimized as illustrated in FIG. 13, to allow for less interruption in the density of heating element/wires 17, and also allow for the same heatable insert 16 to be used in other applications with full heat wire coverage when no ischium opening 19 is desired. This can be done by closing off most of the ischium opening 19 with tabs 19A that can flex and give under the weight of a user (alternatively, it could be said that the opening 19 is comprised of "X" shaped slots that create such tabs 19A).

PARTS AND FEATURES ILLUSTRATED IN
DRAWING FIGURES

1 Mold
  1A upper mold part
  1B lower mold part

2 Dispenser
3 Pegs
  3A base portion
  3B support portion
  3C ledge portion
  3D barrel section
  3E conical head
10 Seat Insert
11 Insert openings
12 Mounting peg openings
13 Perineal opening
14 Perineal insert
15 Ischium insert
16 Heatable insert
17 Embedded heating elements/wires
18 Lead wires for heating element
19 Ischium opening
  19A Ischium opening tabs
20 Seat
  20A upper surface of seat (molded by lower mold part 1B)
  20B lower surface of seat (molded by upper mold part 1A)
21 Openings left in seat 20 by part 3B In view of the foregoing, it should be clear that numerous changes and variations can be made without exceeding the scope of the inventive concept outlined. Thus, though the preferred embodiment is illustrated in the context of a motorcycle seat, the teachings of the invention are not necessarily restricted to such seats. Indeed, potential applications range from seats for all kinds of riders (horseback/motorcycle/ATV) to more mundane chairs and seats used in other applications. Further, though the preferred materials comprising the seat are specified, other materials with similar support and/or molding characteristics may certainly be substituted. In addition, though single layer mats/inserts are shown, the inventive concept does not preclude multiple mat/insert layers or further subdivision of the mat/insert in terms of its constituent materials than those shown. Accordingly, it is to be understood that the embodiment(s) of the invention herein described is/are merely illustrative of the application of the principles of the invention. Reference herein to details of the illustrated embodiment(s) is not intended to limit the scope of the claims, which will themselves recite those features regarded as essential to the invention.

I claim:

1. A seat, comprising:
an insert embedded in a resilient outer layer, which resilient outer layer forms a unitary one-piece layer surrounding said insert; and
wherein said insert comprises at least one of:
a seat insert comprising a semi-rigid mat having at least one of rebound characteristics, and compression set characteristics,
a seat insert including at least one of: a perineal opening, and an ischium opening,
a heatable insert, which heatable insert can be electrically activated to provide heat to said seat,
a heatable insert, which heatable insert includes at least one of: a perineal opening, and an ischium opening,
a perineal insert comprising a material softer than the resilient outer layer, and
an ischium insert comprising a material softer than the resilient outer layer.

2. The seat of claim 1, wherein at least one of:
said seat insert is comprised of closed cell foam,
said heatable insert underlies said seat insert,
said perineal insert is comprised of a gel-like material,
said perineal insert is comprised of sealed gel packets,
said perineal insert is comprised of sealed air packets,
said perineal insert is comprised of sealed air packets with adjustable pressure,
said perineal insert is comprised of super light density foam,
said ischium insert is comprised of a gel-like material,
said ischium insert is comprised of sealed gel packets,
said ischium insert is comprised of sealed air packets,
said ischium insert is comprised of sealed air packets with adjustable pressure, and
said ischium insert is comprised of super light density foam.

3. The seat of claim 1, wherein at least one of: any said insert is completely encapsulated by said resilient outer layer, any said seat insert is comprised of vinyl nitrile closed cell foam, and said resilient outer layer is comprised of polyurethane foam.

4. The seat of claim 1, wherein said seat has an upper surface and a lower surface, and any said insert is at least one of: substantially parallel to said upper surface, and intermediate said upper and lower surfaces.

5. The seat of claim 1, wherein an opening includes flex tabs.

6. The seat of claim 1, wherein at least one said opening includes a sub-insert of at least one of: a material softer than the resilient outer layer, a super-light density foam, a gel-like material, a sealed gel packet, a sealed air packet, and a sealed air packet with adjustable pressure.

7. A seat, comprising:
an insert embedded in a resilient outer layer, which resilient outer layer forms a unitary one-piece layer surrounding said insert;
wherein said insert comprises at least one of:
a seat insert comprising a semi-rigid mat having at least one of rebound characteristics, and compression set characteristics,
a seat insert including at least one of: a perineal opening, and an ischium opening,
a heatable insert, which heatable insert can be electrically activated to provide heat to said seat,
a heatable insert, which heatable insert includes at least one of: a perineal opening, and an ischium opening,
a perineal insert comprising a material softer than the resilient outer layer, and
an ischium insert comprising a material softer than the resilient outer layer;
wherein said seat has an upper surface and a lower surface, and any said insert is at least one of: substantially parallel to said upper surface, and intermediate said upper and lower surfaces; and
wherein any said insert is completely encapsulated by said resilient outer layer.

8. The seat of claim 7, wherein at least one of:
said seat insert is comprised of closed cell foam,
said heatable insert underlies said seat insert,
said perineal insert is comprised of a gel-like material,
said perineal insert is comprised of sealed gel packets,
said perineal insert is comprised of sealed air packets,
said perineal insert is comprised of sealed air packets with adjustable pressure,
said perineal insert is comprised of super light density foam,
said ischium insert is comprised of a gel-like material,
said ischium insert is comprised of sealed gel packets,
said ischium insert is comprised of sealed air packets, said ischium insert is comprised of sealed air packets with adjustable pressure, and
said ischium insert is comprised of super light density foam, and
said resilient outer layer is comprised of reaction injection moldable foam.

9. The seat of claim 7, wherein any said seat insert is comprised of vinyl nitrile closed cell foam, and any said resilient outer layer is comprised of polyurethane foam.

10. The seat of claim 7, wherein an opening includes flex tabs.

11. The seat of claim 7, wherein at least one said opening includes a sub-insert of at least one of: a material softer than the resilient outer layer, a super-light density foam, a gel-like material, a sealed gel packet, a sealed air packet, and a sealed air packet with adjustable pressure.

12. A method for molding a seat, comprising:
providing a seat mold defining the shape of a seat having upper and lower surfaces;
positioning at least one insert in said mold so as to be intermediate said upper and lower surfaces when said mold is closed;
injecting a reacting expanding liquid into said mold in a single injection such that said liquid will expand to fill said mold, forming a resilient outer layer surrounding said at least one insert, which resilient outer layer forms a unitary one-piece layer surrounding said insert; and
wherein said at least one insert at least one of has a different density than the resilient outer layer, is softer or harder than the resilient outer layer, has greater or lesser stiffness than the resilient outer layer, has greater ability to conform to the user's body than the resilient outer layer, is more springy than the resilient outer layer, and is a heatable insert.

13. The method of claim 12, wherein said at least one insert comprises at least one of:
a seat insert comprising a semi-rigid mat having at least one of rebound characteristics, and compression set characteristics,
a seat insert including at least one of: a perineal opening, and an ischium opening,
a heatable insert, which heatable insert can be electrically activated to provide heat to said seat,
a heatable insert, which heatable insert includes at least one of: a perineal opening, and an ischium opening,
a perineal insert comprising a material softer than the resilient outer layer, and
an ischium insert comprising a material softer than the resilient outer layer.

14. The method of claim 13, wherein at least one of:
said seat insert is comprised of closed cell foam,
said heatable insert underlies said seat insert,
said perineal insert is comprised of a gel-like material,
said perineal insert is comprised of sealed gel packets,
said perineal insert is comprised of sealed air packets,
said perineal insert is comprised of sealed air packets with adjustable pressure,
said perineal insert is comprised of super light density foam,
said ischium insert is comprised of a gel-like material,
said ischium insert is comprised of sealed gel packets,
said ischium insert is comprised of sealed air packets,
said ischium insert is comprised of sealed air packets with adjustable pressure, and
said ischium insert is comprised of super light density foam, and
said resilient outer layer is comprised of reaction injection moldable foam.

15. The method of claim 13, wherein any said insert is completely encapsulated by said resilient outer layer, any said seat insert is comprised of vinyl nitric closed cell foam, and said resilient outer layer is comprised of polyurethane foam.

16. The method of claim 13, wherein said seat has an upper surface and a lower surface, and any said insert is at least one of: substantially parallel to said upper surface, and intermediate said upper and lower surfaces.

17. The method of claim 13, wherein an opening includes flex tabs.

18. The method of claim 13, wherein at least one said opening includes a sub-insert of at least one of: a material softer than the resilient outer layer, a super-light density foam, a gel-like material, a sealed gel packet, a sealed air packet, and a sealed air packet with adjustable pressure.

19. The method of claim 13 wherein openings in said seat insert aid said reacting expanding liquid in expanding through and around said seat insert so as to fill said mold.

20. The method of claim 19, wherein at least one of said perineal opening and said ischium openings aids said reacting expanding liquid in expanding through and around said insert so as to fill said mold.

21. The method of claim 13, wherein pegs extending from one of said surfaces support said at least one insert in said mold so as to be intermediate said upper and lower surfaces when said mold is closed.

* * * * *